United States Patent Office  3,650,989
Patented Mar. 21, 1972

3,650,989
PREPARATION OF SILICA-ALUMINA CATALYST
Saul G. Hindin, Mendham, Joseph C. Dettling, Jackson, and William R. Larsen, Fords, N.J., assignors to Engelhard Minerals & Chemicals Corporation
No Drawing. Filed Dec. 9, 1969, Ser. No. 883,576
Int. Cl. B01j *11/36, 11/40*
U.S. Cl. 252—451           7 Claims

ABSTRACT OF THE DISCLOSURE

A highly acidic silica-alumina catalyst, containing a relatively large amount of alkali metal, e.g. up to about 1%, is prepared by a process comprising acidifying an alkali metal silicate to a pH of less than about 5.0 to form a silica hydrogel, washing the hydrogel with water, slurrying the hydrogel in a solution of an aluminum salt, adding to the slurry an ammoniacal base in excess of the amount required for neutralization of the aluminum salt, and separating, drying and calcining the resultant silica-alumina composite.

BACKGROUND OF THE INVENTION

Silica-alumina composites are widely used as catalysts and as catalyst carriers for many reactions, including hydrocracking and isomerization. It is well-known that the method of preparing the catalyst may be the determining factor in whether a particular composite may be useful commercially for a given process. Even small variations in the preparation and even small amounts of impurities, particularly the alkali metals, can cause marked changes in a catalyst with respect to its activity, selectivity and life. Numerous methods have been suggested for preparing such composites. These methods include various cogelling, aging and high temperature steps, and especially the removal of undesirable components, particularly the alkali metal ions. It will be appreciated that each additional step is not only costly in both the time and the labor involved, but also imposes additional technical problems inn the preparation. It is not surprising therefore that the search is still being carried on for more effective catalysts and more economical methods of preparation.

Generally, the source of the activity of the silica-alumina catalysts resides in the acidity produced by the combination of silica and alumina. The presence of alkali metal ions such as the sodium cation normally lowers the total catalyst acidity with concomitant lowering of the catalyst activity. The alkali metal ion which is the main source of trouble is usually sodium since the silica is normally prepared from sodium silicate. Some sodium also may be present in the aluminum salts used in the preparation. Heretofore, silica-alumina formed by known methods have been treated so that the sodium content is reduced to less than 0.10% and generally about 0.02%. Otherwise such catalysts were not acceptable commercially, since they lacked sufficient activity. In order to reduce the sodium to this low level such treatments as ion exchange steps followed by numerous washing steps are used which, as indicated above, added to the technical and cost problems in the preparation of silica-alumina.

In accordance with this present invention, silica-alumina is prepared by a method which uses no aging or high temperature mixing steps, and moreover, the resultant composite can retain relatively high levels of sodium and still possess high acidity and high activity. The high acidity of the material is evidenced by unusually high catalytic activity for the cracking of high molecular weight hydrocarbons to lighter compounds even when as much as about 1% sodium is present in the catalyst composition. It is not known exactly why the composite displays this unusual characteristic, but it is believed that in contradistinction to other methods the sodium is in some way locked into the crystal structure and thereby does not affect the acidity of the catalyst.

THE INVENTION

In accordance with another aspect, the present invena a highly acidic silica-alumina is prepared by a process comprising acidifying an alkali metal silicate with a mineral acid to a pH of less than about 5.0 to form a silica hydrogel, washing the hydrogel with water, slurrying the hydrogel in a solution of an alumina salt, adding to the slurry an ammoniacal base in excess of the amount required for neutralization of the aluminum salt, and separating, drying and calcining the resultant silica-alumina deposit.

In accordance with another aspect, the present invention is concerned with the highly active catalyst obtained by the foregoing method, even though it contains relatively large amounts of alkali metal, possibly up to 1%.

The silica component of the silica-alumina composite of this invention is prepared by dispersing an alkali metal silicate in water in an amount corresponding to about 50 to 90% by weight $SiO_2$ in the resulting dry composite. The alkali metal silicate may be chosen from any one of the known alkali metal silicates. Preferably sodium silicate is used because of its lower cost. The pH of this solution is adjusted to less than about 5.0. Preferably the pH is adjusted to about 0.5 to 3.5. To adjust the pH any acid may be used provided such acid does not react with the silica. Examples of suitable acids are sulfuric, hydrochloric, nitric, acetic, phosphoric, and trichloracetic. A preferred acid is hydrochloric for the reason of cost.

In contrast with other methods, the silica which precipitates is not permitted to age. It is mixed with the acid at the low pH for a period of about 5 to 30 min., and then filtered. Thereafter the filtrate is reslurried in water, washed and filtered so that the resultant silica hydrogel contains no more than about 2% sodium. However, in clear distincton from conventional catalysts the hydrogel which is used to prepare the final composite may contain up to about 2% sodium.

The composite silica-alumina is formed as follows: The silica hydrogel is dispersed in water and a solution of an aluminum salt is mixed with the silica hydrogel slurry in a sufficient amount to give a final catalyst containing 10 to 50% $Al_2O_3$ in the dry composite. The aluminum salt may be, for example, the nitrate, sulfate chloride, or acetate. Preferably the salt is aluminum nitrate because its anion is completely disposable. The aluminum salt solution and silica hydrogel dispersed in water are mixed for a period of 5 to 15 min. Thereafter the composite silica-alumina is formed by adding an ammoniacal base such as ammonium hydroxide, ammonium carbonate, a quaternary ammonium hydroxide, preferably ammonium hydroxide, in an amount in excess of that required for complete neutralization of the aluminum salt. Typically an excess of about 10% is used. The resultant composite is filtered.

It has been found that the composite formed in this way can be readily extruded, e.g. through a ⅛" die at 200–300 p.s.i., or it can be dried to a powder then mulled with water and extruded, or it can be formed into pellets, as by pelletizing or casting.

The catalyst is dried at an elevated temperature, e.g.

300° C. to 800° C., determined by the ultimate use of the composite material.

The resultant composite material may be used as a catalyst, as noted above, for cracking high molecular weight hydrocarbons to lighter compounds. However, the composite is not restricted to such use. It may be used as a catalyst or catalyst carrier for such reactions of isomerization, hydroisomerization, cyclization, and reforming, and indeed for any reaction requiring an acidic catalyst carrier material. The following examples will further illustrate the present invention.

EXAMPLE 1

This example illustrates the general method of preparing silica-alumina composites according to this invention.

(a) Preparation of the silica gel

The silica gel for compositing was prepared as follows: To a slurry of 2376 grams of sodium silicate in 7.5 liters of water was added concentrated HCl at a rate of about 10 to 15 ml./minute until about 450 ml. of acid was added and the reaction medium had a pH of 2.2. After adding 1 liter of water and stirring for ½ hour to obtain a uniform mixture, the reaction mixture was filtered. The gel was washed three times by reslurrying each time in five liters of water and filtering. The gel so prepared was stored in a plastic bag until composited with alumina.

In accordance with this procedure numerous batches of silica gel were prepared for compositing with alumina, each batch being prepared at a different pH by varying the amount of mineral acid added to the sodium silicate.

(b) Preparation of silica-alumina composite

The silica gel was composited with alumina as follows: To a slurry of 2724 grams of the silica gel in 1250 cc. of water (pH of slurry 2.7) was added a solution of 553 grams of $Al(NO_3)_3 \cdot 9H_2O$ in 1250 cc. of water. The pH of the aluminum nitrate solution was 1.2 and the slurry, after mixture with the aluminum nitrate solution, had a pH of 1.5. After mixing for ½ hour, 370 cc. of concentrated $NH_4OH$ was added. The final pH was 7.5. The reaction mixture was stirred for ½ hour, and then without further washing, filtered and extruded through a ⅛" die at 200–300 p.s.i. The extrudate was dried at 110° C. overnight and then calcined in air for two hours at 700° C. to give a composite containing 15% $Al_2O_3$ and 85% $SiO_2$.

By varying the amount of aluminum nitrate used, composites were prepared containing from 10% $Al_2O_3$ up to about 50% $Al_2O_3$.

EXAMPLE 2

The silica-alumina catalysts prepared according to Example 1 and a standard commercial cracking catalyst were tested for ctivity in a modification of the generally recognized D+L test, which is performed as follows:

One cubic centimeter of a gas oil was charged automatically during a five minute period through a hypodermic needle to a reactor held at 900° F. and containing 5 grams of the silica-alumina catalyst. When addition of the oil is complete the system was purged for 15 minutes with nitrogen. The liquid and gaseous products were collected and measured. In such a test the activity of the catalyst is related to the amount of liquid recovered, the lower the amount of liquid recovered, the greater the activity of the catalyst.

Results of this modified D+L test for typical silica-alumina catalysts prepared according to Example 1 are given in the table.

As can be seen from the table, silica-alumina catalysts using a silica gel formed below a pH of 5.0 are considerably more active than those formed above a pH of 5.0.

EXAMPLE 3

This example further illustrates the importance of pH at the time of formation of the silica gel.

Following the procedure of Example 1 sodium silicate was acidified with HCl to a pH of 5.8. In this instance, however, 25 ml. of concentrated HCl was added to the water in the second washing of the gel so that the filtrate had a pH of 2.5. After a third water washing and compositing with alumina to obtain a final catalyst containing 10% $Al_2O_3$–90% $SiO_2$, the catalyst was subjected to the D+L test of Example 2 and found to be less active than catalysts whose silica component was formed below a pH of 5.0. The results of this test are included in the table as catalyst 12.

This test shows that subsequent acidification of the silica gel is not as significant as the pH at the time of gel formation.

EXAMPLE 4

The high activity of the catalyst of this invention compared with a commercial cracking catalyst is demonstrated by this example.

A catalyst sample of the type identified in the table as catalyst 5 and a conventional commercial catalyst identified in the table as catalyst 15 were subjected to a test to compare their catalytic activities for cracking activity. The test consisted of passing a standard gas oil over the catalyst at elevated temperature and then flushing with nitrogen as in our modified test. In this test however the product was distilled to a 400° F. (gasoline) end point, the coke on catalyst determined, and the composition of the gaseous product determined.

It was found that despite the fact that the catalysts of the present invention had a sodium content of about 31 times that of the conventional cracking catalyst, activity was quite comparable, as were the gas compositions and the coke make.

TABLE

| Catalyst | Composition (percent) | | Calcination | | Surface area, m.²/g. | pH at $SiO_2$ gel formation | Na in composite, percent | D+L Test | |
|---|---|---|---|---|---|---|---|---|---|
| | $Al_2O_3$ | $SiO_2$ | Hours | °C. | | | | Gas, cc. | Liquid, cc. |
| 1 | 10 | 90 | 3 | 600 | 576 | 1.4 | 0.34 | 196 | 0.18 |
| 2 | 15 | 85 | 3 | 600 | 504 | 2.2 | 0.60 | 226 | 0.17 |
| 3 | 10 | 90 | 3 | 600 | 539 | 2.5 | 0.40 | 184 | 0.20 |
| 4 | 10 | 90 | 3 | 600 | 543 | 3.3 | 0.22 | 188 | 0.22 |
| 5 | 15 | 85 | 2 | 700 | 366 | 2.2 | 0.63 | 254 | 0.17 |
| 6 | 10 | 90 | 3 | 600 | 628 | 2.4 | 0.17 | 192 | 0.20 |
| 7 | 50 | 50 | 4 | 600 | ---- | 2.3 | 0.03 | 270 | 0.22 |
| 8 | 50 | 50 | 2 | 500 | 395 | 2.3 | 0.0023 | 232 | 0.23 |
| 9 | 10 | 90 | 3 | 600 | 628 | 4.4 | 0.17 | 187 | 0.24 |
| 10 | 10 | 90 | 2 | 600 | ---- | 4.8 | 0.22 | 200 | 0.24 |
| 11 | 10 | 90 | 2 | 600 | ---- | 5.3 | 0.48 | 180 | 0.30 |
| 12ª | 10 | 90 | 3 | 600 | 526 | 5.8 | 0.95 | 130 | 0.36 |
| 13 | 10 | 90 | 2 | 600 | ---- | 6.3 | 0.48 | 185 | 0.20 |
| 14 | 15 | 85 | 2 | 700 | 533 | 7.1 | 1.94 | 186 | 0.40 |
| 15ᵇ | 13 | 87 | 2 | 600 | 434 | ---- | 0.02 | 192 | 0.20 |

ª Prepared according to Example 3.
ᵇ Conventional commercial cracking catalyst.

What is claimed:
1. A method for preparing a highly acidic silica-alumina catalyst containing relatively high amounts of alkali metal comprising:
(a) acidifying an alkali metal silicate to a pH of less than about 5.0 to form a silica hydrogel,
(b) washing the hydrogel with water to an alkali metal content of less than about 2%,
(c) slurrying the hydrogel in a solution of aluminum salt,

(d) adding to the slurry an ammoniacal base in excess of the amount required for neutralization of the aluminum salt, and (e) separating, drying, and calcining the resultant silica-alumina composite.

2. The method of claim 1 wherein the silica gel is formed at a pH of about 0.5 to 3.5.

3. The method of claim 1 wherein the alkali metal silicate is present in an amount ranging from 50 to 90% by weight based on the $SiO_2$ in the final silica-alumina composite and the aluminum salt in the slurry is present in the amount ranging from 10 to 50% by weight based on the $Al_2O_3$ in the final silica-alumina composite.

4. The method of claim 1 wherein the alkali metal silicate is sodium silicate.

5. The method of claim 1 wherein the aluminum salt is aluminum nitrate.

6. The method of claim 1 wherein the ammoniacal basis is ammonium hydroxide.

7. The method of claim 4 wherein the washed silica hydrogel prepared from sodium silicate has a sodium content of up to about 1%.

References Cited
UNITED STATES PATENTS

| | | | |
|---|---|---|---|
| 2,334,872 | 11/1943 | Free et al. | 252—451 X |
| 2,470,142 | 5/1949 | Chapman et al. | 252—451 |
| 2,477,373 | 7/1949 | Hunter | 252—451 |
| 2,565,886 | 8/1951 | Ryland | 252—453 |
| 2,872,410 | 2/1959 | Erickson | 252—453 X |

DANIEL E. WYMAN, Primary Examiner

C. F. DEES, Assistant Examiner

U.S. Cl. X.R.

252—455 R